US011450119B2

(12) United States Patent
Takata et al.

(10) Patent No.: US 11,450,119 B2
(45) Date of Patent: Sep. 20, 2022

(54) INFORMATION ACQUISITION SYSTEM, CONTROL APPARATUS, INFORMATION ACQUISITION METHOD, AND STORAGE MEDIUM

(71) Applicant: NEC Corporation, Tokyo (JP)

(72) Inventors: Tsugunori Takata, Tokyo (JP); Hideo Yokoi, Tokyo (JP); Kota Iwamoto, Tokyo (JP); Soma Shiraishi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/276,217

(22) PCT Filed: Sep. 11, 2019

(86) PCT No.: PCT/JP2019/035658
§ 371 (c)(1),
(2) Date: Mar. 15, 2021

(87) PCT Pub. No.: WO2020/059587
PCT Pub. Date: Mar. 26, 2020

(65) Prior Publication Data
US 2022/0036042 A1     Feb. 3, 2022

(30) Foreign Application Priority Data

Sep. 20, 2018   (JP) .............................. JP2018-176035

(51) Int. Cl.
*G06K 9/00* (2022.01)
*G06V 20/64* (2022.01)
(Continued)

(52) U.S. Cl.
CPC .............. *G06V 20/64* (2022.01); *G06V 10/22* (2022.01); *G06V 30/224* (2022.01)

(58) Field of Classification Search
CPC ....... G06V 20/64; G06V 30/224; G06V 10/22
See application file for complete search history.

(56) References Cited

U.S. PATENT DOCUMENTS 6,711,293 B1 *   3/2004   Lowe ........................ G06T 7/73
                                                        382/220
8,224,021 B2 *   7/2012   Vaidya ................... G06V 20/52
                                                        382/199
(Continued)

FOREIGN PATENT DOCUMENTS

JP    2001-174881 A    6/2001
JP    2004-266511 A    9/2004
(Continued)

OTHER PUBLICATIONS

International Search Report for PCT Application No. PCT/JP2019/035658, dated Nov. 12, 2019.
(Continued)

*Primary Examiner* — Gregory M Desire

(57) ABSTRACT

Provided is an information acquisition system including: an image capture apparatus including a camera that captures a target object to generate an image; and a control apparatus including a control unit that controls the image capture apparatus so that a plurality of images in accordance with a plurality of different environment conditions are generated and an information acquisition unit that acquires target object information input to a discriminator that identifies an object, in which the target object information includes the plurality of images or a plurality of feature amounts obtained from the plurality of images.

13 Claims, 14 Drawing Sheets

(51) Int. Cl.
  *G06V 30/224* (2022.01)
  *G06V 10/22* (2022.01)

(56) References Cited

U.S. PATENT DOCUMENTS

| | | | | |
|---|---|---|---|---|
| 8,611,659 | B2* | 12/2013 | Williams | H04N 5/2723 |
| | | | | 382/173 |
| 8,977,055 | B2* | 3/2015 | Fukuchi | G06V 20/20 |
| | | | | 382/181 |
| 9,456,144 | B2* | 9/2016 | Miyazaki | H04N 5/2354 |
| 2004/0066970 | A1* | 4/2004 | Matsugu | G06V 10/10 |
| | | | | 382/217 |
| 2005/0074140 | A1* | 4/2005 | Grasso | G06T 7/12 |
| | | | | 382/103 |
| 2013/0058530 | A1 | 3/2013 | Naito et al. | |
| 2014/0334673 | A1 | 11/2014 | Naito | |
| 2017/0069075 | A1 | 3/2017 | Okuda | |
| 2022/0036042 | A1* | 2/2022 | Takata | G06T 7/00 |

FOREIGN PATENT DOCUMENTS

| | | |
|---|---|---|
| JP | 2009-134478 A | 6/2009 |
| JP | 2013-054673 A | 3/2013 |
| JP | 2013-246790 A | 12/2013 |
| JP | 2014-219881 A | 11/2014 |
| JP | 2017-049974 A | 3/2017 |
| WO | 2016/092646 A1 | 6/2016 |

OTHER PUBLICATIONS

Japanese Office Action for JP Application No. 2018-176035 dated May 12, 2020 with English Translation.

\* cited by examiner

FIG. 6

| Product ID | Product name | Image | Feature amount | Camera ID | Emission condition | Product position |
|---|---|---|---|---|---|---|
| 10001 | AAA hat | a001.jpg | a001.dat | camera 1 | recipe 1 | position A |
| | | a002.jpg | a002.dat | camera 1 | recipe 2 | position A |
| | | a003.jpg | a003.dat | camera 1 | recipe 3 | position A |
| | | a004.jpg | a004.dat | camera 1 | recipe 4 | position A |
| | | a005.jpg | a005.dat | camera 2 | recipe 1 | position A |
| | | a006.jpg | a006.dat | camera 2 | recipe 2 | position A |
| | | a007.jpg | a007.dat | camera 2 | recipe 3 | position A |
| | | ... | ... | ... | ... | ... |
| | | ... | ... | ... | ... | ... |
| 10002 | BBB hat | b001.jpg | b001.dat | camera 1 | recipe 1 | position A |
| | ... | ... | ... | ... | ... | ... |
| ... | ... | ... | ... | ... | ... | ... |

INFORMATION ACQUISITION SYSTEM, CONTROL APPARATUS, INFORMATION ACQUISITION METHOD, AND STORAGE MEDIUM

This application is a National Stage Entry of PCT/JP2019/035658 filed on Sep. 11, 2019, which claims priority from Japanese Patent Application 2018-176035 filed on Sep. 20, 2018, the contents of all of which are incorporated herein by reference, in their entirety.

TECHNICAL FIELD

The present invention relates to an information acquisition system, a control apparatus, an information acquisition method, and a storage medium.

BACKGROUND ART

Patent Literature 1 discloses a technique for creating a recognition dictionary used for object recognition. In the technique of Patent Literature 1, a feature amount is extracted after a captured image is rotated, and a plurality of feature amounts of the image with different angles are acquired. Accordingly, the work load required for creating a recognition dictionary is reduced.

CITATION LIST

Patent Literature

PTL 1: Japanese Patent Application Laid-open No. 2013-246790

SUMMARY OF INVENTION

Technical Problem

To improve the accuracy in object recognition, it may be necessary to acquire many different images. Patent Literature 1 discloses reduction in a work load by extracting a plurality of feature amounts from a single image but does not disclose anything about efficient acquisition of a plurality of images.

The example object of the present invention intends is to provide an information acquisition system, a control apparatus, an information acquisition method, and a storage medium that can efficiently acquire a plurality of object identification images captured in accordance with a plurality of environment conditions.

Solution to Problem

According to one example aspect of the present invention, provided is an information acquisition system including: an image capture apparatus including a camera that captures a target object to generate an image; and a control apparatus including a control unit that controls the image capture apparatus so that a plurality of images in accordance with a plurality of different environment conditions are generated and an information acquisition unit that acquires target object information input to a discriminator that identifies an object, in which the target object information includes the plurality of images or a plurality of feature amounts obtained from the plurality of images.

According to another example aspect of the present invention, provided is a control apparatus including: a control unit that controls an image capture apparatus so that a plurality of images in accordance with a plurality of different environment conditions are generated; and an information acquisition unit that acquires target object information input to a discriminator that identifies an object, wherein the target object information includes the plurality of images or a plurality of feature amounts obtained from the plurality of images.

According to another example aspect of the present invention, provided is an information acquisition method including: controlling an image capture apparatus so that a plurality of images in accordance with a plurality of different environment conditions are generated; and acquiring target object information input to a discriminator that identifies an object, wherein the target object information includes the plurality of images or a plurality of feature amounts obtained from the plurality of images.

According to another example aspect of the present invention, provided is a storage medium storing a program that causes a computer to perform an information acquisition method including: controlling an image capture apparatus so that a plurality of images in accordance with a plurality of different environment conditions are generated; and acquiring target object information input to a discriminator that identifies an object, wherein the target object information includes the plurality of images or a plurality of feature amounts obtained from the plurality of images.

Advantageous Effects of Invention

According to the present invention, an information acquisition system, a control apparatus, an information acquisition method, and a storage medium that can efficiently acquire a plurality of object identification images captured in accordance with a plurality of environment conditions can be provided.

BRIEF DESCRIPTION OF DRAWINGS

FIG. 6 is a table illustrating an example of information acquired by the information acquisition system according to the first example embodiment.

DESCRIPTION OF EMBODIMENTS

Figure 1:
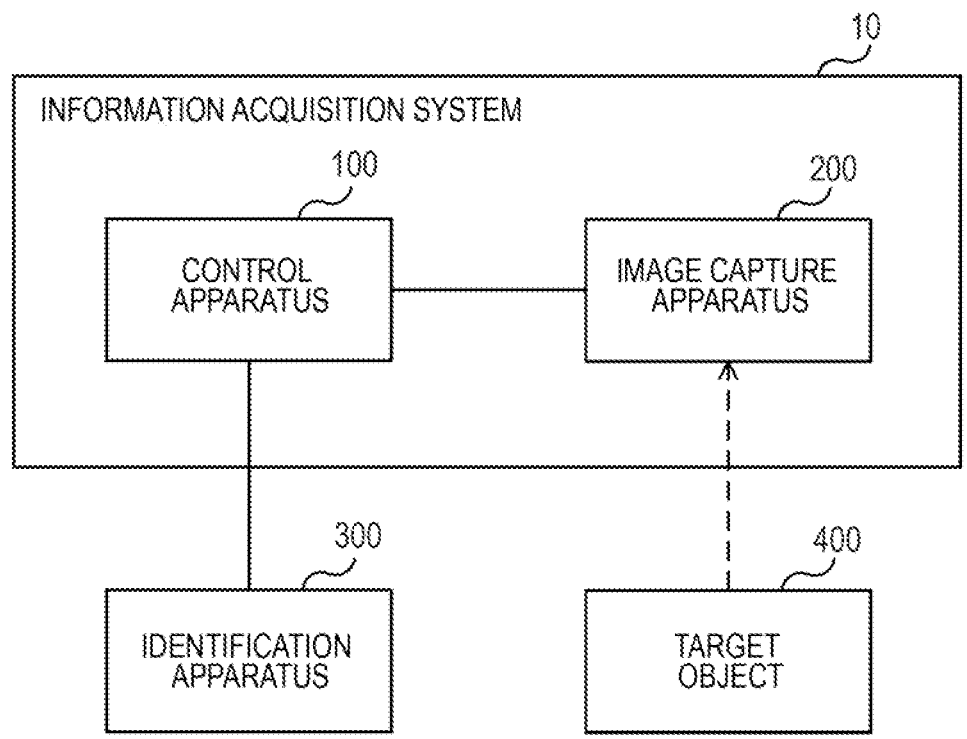
FIG. 1 is a block diagram illustrating an overall configuration of an information acquisition system according to a first example embodiment.

The exemplary example embodiments of the present invention will be described below with reference to the drawings. In the drawings, the same components or corresponding components are labeled with the same references, and the description thereof may be omitted or simplified.

First Example Embodiment

An information acquisition system 10 according to the present example embodiment will be described with reference to FIG. 1 to FIG. 6. The information acquisition system 10 of the present example embodiment is a system for acquiring information such as a target object image input to an object recognition program or a feature amount extracted from the target object image. Herein, a target object image and a feature amount extracted from the target object image may be referred to as target object information in a more general sense.

FIG. 1 is a block diagram illustrating an overall configuration of the information acquisition system 10 according to the present example embodiment. The information acquisition system 10 has a control apparatus 100 and an image capture apparatus 200 that are connected to each other so as to be able to communicate with each other.

The control apparatus 100 and the image capture apparatus 200 acquire target object information on a target object 400 in cooperation with each other. The control apparatus 100 is an apparatus that controls the image capture apparatus 200. The image capture apparatus 200 is an apparatus that captures the target object 400 in accordance with the control of the control apparatus 100 to acquire an image of the target object 400. The type of the target objects 400 is not particularly limited as long as it may be a target of object recognition and may be, for example, a product sold in a retail store.

An identification apparatus 300 is an apparatus that identifies a classification or the like of an object from an object image. The identification apparatus 300 performs identification of an object by using an object recognition model constructed with input of an image of the target object 400 or a feature amount extracted from an image of the target object 400. This object identification model includes a discriminator constructed based on a machine learning model such as deep learning, feature amount matching technology, or the like, for example.

Note that the overall configuration is an example, and the control apparatus 100 and the image capture apparatus 200 may be formed as an integrated apparatus, or the function of the identification apparatus 300 may be embedded inside the information acquisition system 10, for example.

Figure 2:
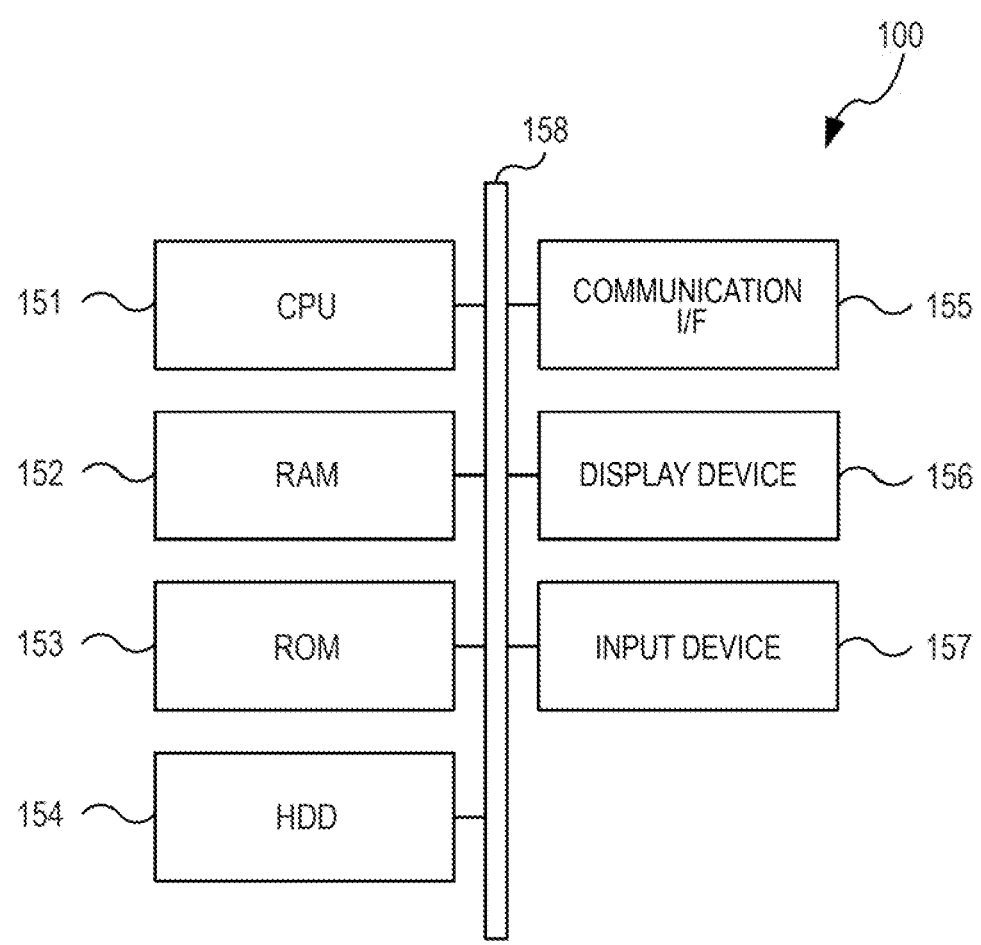
FIG. 2 is a block diagram illustrating a hardware configuration example of a control apparatus according to the first example embodiment.

FIG. 2 is a block diagram illustrating a hardware configuration example of the control apparatus 100. The control apparatus 100 has a central processing unit (CPU) 151, a random access memory (RAM) 152, a read only memory (ROM) 153, and a hard disk drive (HDD) 154 as a computer that performs calculation, control, and storage. Further, the control apparatus 100 has a communication interface (I/F) 155, a display device 156, and an input device 157. The CPU 151, the RAM 152, the ROM 153, the HDD 154, the communication I/F 155, the display device 156, and the input device 157 are connected to each other via a bus 158. Note that the display device 156 and the input device 157 may be connected to the bus 158 via a drive device (not illustrated) used for driving these devices.

While components forming the control apparatus 100 are illustrated as an integrated apparatus in FIG. 2, a part of functions thereof may be provided by an external device. For example, the display device 156 and the input device 157 may be an external device independent of a part forming the function of a computer including the CPU 151 and the like.

The CPU 151 is a processor having a function of performing a predetermined calculation in accordance with a program stored in the ROM 153, the HDD 154, or the like and also controlling each component of the control apparatus 100. The RAM 152 is formed of a volatile storage medium and provides a temporary memory area necessary for the operation of the CPU 151. The ROM 153 is formed of a nonvolatile storage medium and stores necessary information such as a program used for the operation of the control apparatus 100. The HDD 154 is a storage device that is formed of a nonvolatile storage medium and stores data such as an acquired image, a program used for the operation of the control apparatus 100, or the like.

The communication I/F 155 is a communication interface based on the specification such as Ethernet (registered trademark), Wi-Fi (registered trademark), 4G, or the like, which is a module used for communicating with other devices. The display device 156 is a liquid crystal display, an organic light emitting diode (OLED) display, or the like and is used for displaying an acquired image, a setting of an image capturing condition, a graphical user interface (GUI) for operation input, or the like. The input device 157 is a keyboard, a pointing device, or the like and is used by the user for operating the control apparatus 100. An example of the pointing device may be a mouse, a trackball, a touch panel, a pen tablet, or the like. The display device 156 and the input device 157 may be integrally formed as a touch panel.

Note that the hardware configuration illustrated in FIG. 2 is an example, and a device other than the above may be added, or some of the devices may not be provided. Further, some of the devices may be replaced with another device having the same function. Furthermore, a part of the function of the present example embodiment may be provided by another device via a network, or the function of the present example embodiment may be distributed and implemented in a plurality of devices. For example, the HDD 154 may be replaced with a solid state drive (SSD) using a semiconductor memory or may be replaced with cloud storage.

Figure 3:
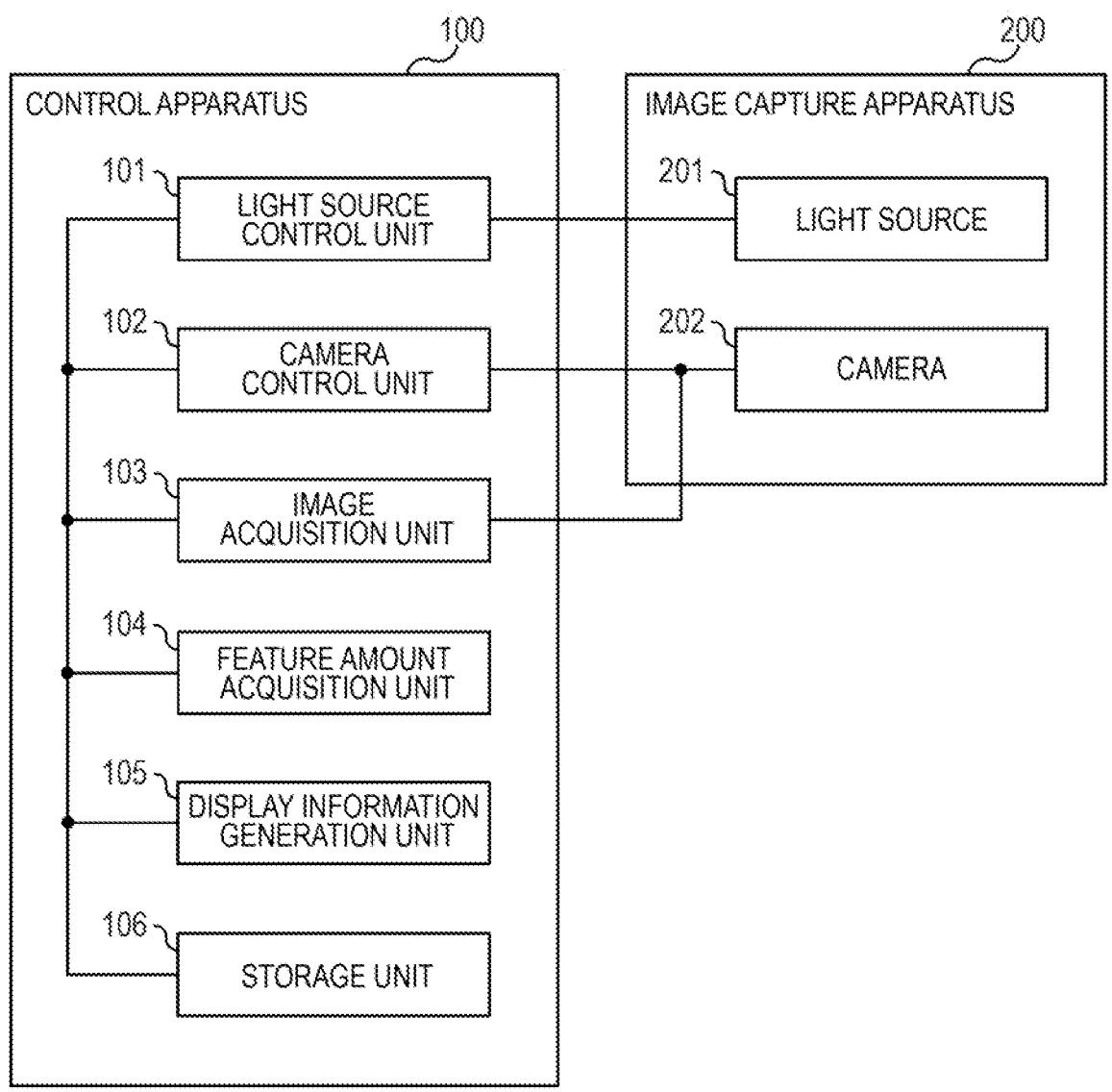
FIG. 3 is a function block diagram of the control apparatus and an image capture apparatus according to the first example embodiment.

FIG. 3 is a function block diagram of the control apparatus 100 and the image capture apparatus 200 according to the present example embodiment. The control apparatus 100 has a light source control unit 101, a camera control unit 102, an image acquisition unit 103, a feature amount acquisition unit 104, a display information generation unit 105, and a storage unit 106. The image capture apparatus 200 has a light source 201 and a camera 202. Note that, although FIG. 3 illustrates the single light source 201 and the single camera 202, there may be a plurality of light sources 201 and a plurality of cameras 202.

The CPU 151 loads a program stored in the ROM 153, the HDD 154, or the like into the RAM 152 and executes the program. Accordingly, the CPU 151 implements functions of the light source control unit 101, the camera control unit 102, the image acquisition unit 103, the feature amount acquisition unit 104, and the display information generation unit 105. The CPU 151 implements a function of the storage unit 106 by controlling the HDD 154 based on the program. Specific processes performed on respective units will be described later.

The light source 201 is a light-emitting device that emits light used for image capturing to the target object 400. The light source 201 has a light-emitting element such as an incandescent lamp, a fluorescent lamp, or a light emitting diode (LED) and a drive circuit having functions of current supply, dimming, or the like. The light emission condition such as turning on or off of light emission of the light source 201, a light amount during light emission, a light emission timing, and a light color (wavelength distribution of the light) may be controlled by the light source control unit 101.

The camera 202 is a device such as a digital camera that captures the target object 400 and generates electronic data of a static image or a moving image. The camera 202 is formed including an image pickup device such as a complementary metal oxide semiconductor (CMOS) image sensor, a control circuit, a signal processing circuit, or the like. The image capturing condition such as whether or not to perform image capturing by the camera 202, an image capturing timing, a shutter speed, an aperture value, a focal distance, or international organization for standardization (ISO) sensitivity may be controlled by the camera control unit 102.

Figure 4:
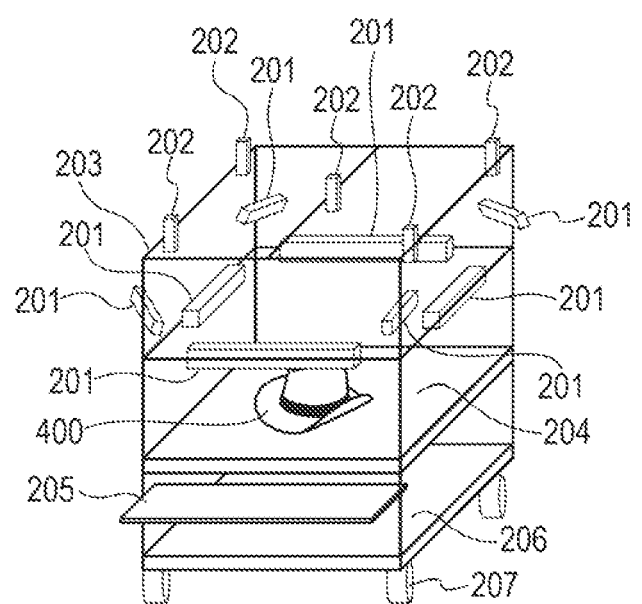
FIG. 4 is a diagram schematically illustrating the external appearance of the image capture apparatus according to the first example embodiment.

FIG. 4 is a diagram schematically illustrating the external appearance of the image capture apparatus 200 according to the first example embodiment. The image capture apparatus 200 has a plurality of light sources 201, a plurality of cameras 202, a frame 203, a placement stage 204, an input device installation stage 205, a control apparatus installation stage 206, and a plurality of wheels 207.

The placement stage 204 is a stage on which a target object 400 is placed at image capturing. The user places the target object 400 to be captured on the top surface of the placement stage 204. The frame 203 is made up of bar-like members forming the framework of the image capture apparatus 200. The members of the frame 203 are combined in a three-dimensional lattice shape above the placement stage 204. The plurality of cameras 202 are installed at positions different from each other on the top stage of the frame 203. The plurality of light sources 201 are installed at positions different from each other on a stage between the plurality of cameras 202 and the placement stage 204. The plurality of light sources 201 are installed at positions from which the plurality of light sources 201 can emit light to the target object 400 on the placement stage 204. The plurality of light sources 201 emit light to the target object 400 from angles different from each other. The plurality of cameras 202 are installed at positions from which the plurality of cameras 202 can capture the target object 400 on the placement stage 204. The plurality of cameras 202 captures the target object 400 from angles different from each other.

Note that, although arranged only above the target object 400 in FIG. 4, the plurality of light sources 201 and the plurality of cameras 202 may be arranged in the side of the target object 400.

The input device installation stage 205 is a stage on which the input device 157 such as a keyboard, a mouse, or the like is installed. The input device installation stage 205 and the input device 157 installed thereon can be accommodated under the placement stage 204 so as not to be an obstacle when the target object 400 is placed on the placement stage 204.

The control apparatus installation stage 206 is provided under the placement stage 204. The control apparatus installation stage 206 is a stage on which a main body of a computer forming the control apparatus 100 is installed. An apparatus forming the information acquisition system 10 such as a power supply apparatus that supplies power to the light source 201 may be installed on the control apparatus installation stage 206.

The plurality of wheels 207 are provided on the lowest stage of the image capture apparatus 200. This makes it easier to carry the image capture apparatus 200.

Note that, although not illustrated in FIG. 4, the display device 156 may be attached to the frame 203, may be installed on the input device installation stage 205, or may be installed in a different place from the image capture apparatus 200, for example.

Figure 5:
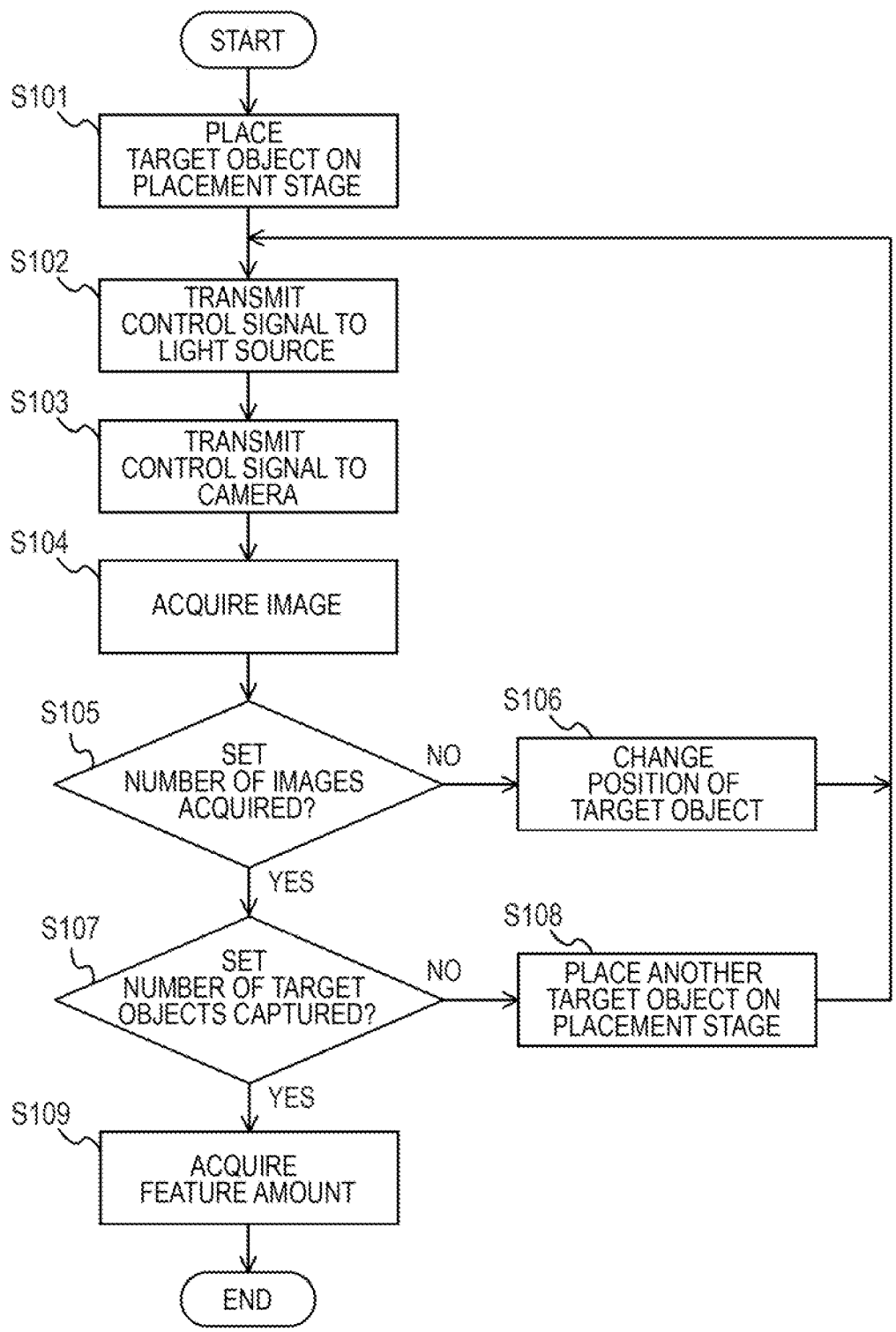
FIG. 5 is a flowchart illustrating a process of acquiring target object information performed by the control apparatus according to the first example embodiment.

FIG. 5 is a flowchart illustrating a process of acquiring target object information performed by the control apparatus 100 according to the present example embodiment. The operation of the control apparatus 100 will be described with reference to FIG. 5.

The process of FIG. 5 is performed when the user operates the information acquisition system 10 to start the control of the image capture apparatus 200. In step S101, the control apparatus 100 performs a process for placing the target object 400 on the placement stage 204. This process may be, for example, a process such that the display information generation unit 105 generates display information including a message that urges the user to place the target object 400 on the placement stage 204 and causes the display device 156 to display the message.

Note that, when the target object 400 is already placed, such as when the operation procedure of the information acquisition system 10 is to place the target object 400 on the placement stage 204 in advance, the process of step S101 may be omitted.

In step S102, the light source control unit 101 generates a control signal used for controlling each of the plurality of light sources 201 and transmits the control signal to each of the plurality of light sources 201. Thereby, the light source control unit 101 can control the light emission condition such as turning on or off of light emission of the light source 201, a light amount during light emission, a light emission timing, a light color (wavelength distribution of the light), or the like.

In step S103, the camera control unit 102 generates control signals used for controlling the plurality of cameras 202 and transmits the control signal to each of the plurality of cameras 202. This enables the camera control unit 102 to control the image capturing conditions such as whether or not to perform image capturing, an image capturing timing, a shutter speed, an aperture value, a focal distance, ISO sensitivity, or the like. The plurality of cameras 202 then perform image capturing on the target object 400 to capture a plurality of images. Note that image capturing operations performed by the plurality of cameras 202 may be simultaneously performed or may be sequentially performed. Note that the light source control unit 101 and the camera control unit 102 both are to control the image capture apparatus 200 and thus may be referred to as a control unit in a more general sense.

Note that the emission condition or the image capturing condition described above may be referred to as an environment condition in a more general sense. With a change of the emission condition of the light source 201, a plurality of image may be generated in accordance with a plurality of different environment conditions. Since the plurality of cameras 202 are arranged at positions different from each other, a plurality of images captured by the plurality of cameras 202 are images captured from different capturing positions (viewpoints). In other words, it can be said that a plurality of images in accordance with a plurality of different environment conditions are captured by the plurality of cameras 202. Note that the environment condition may be set in advance or may be input by the user at the phase of step S102 or S103.

In step S104, the image acquisition unit 103 acquires a plurality of images captured by the plurality of cameras 202. The plurality of captured images are stored in the storage unit 106.

In step S105, the CPU 151 determines whether or not a preset number of images have been acquired. If a predetermined number of images have been acquired (step S105, YES), the process proceeds to step S107. If a predetermined number of images have not yet been acquired (step S105, NO), the process proceeds to step S106.

In step S106, the control apparatus 100 performs a process for changing the position of the target object 400. For example, this process may be a process in which the display information generation unit 105 generates display information including a message to urge the user to move the position of the target object 400 and causes the display device 156 to display the message. The process then returns to step S102, and the same image acquisition is performed on the target object 400 whose position has been changed.

Note that, although the determination criterion in step S105 is the number of images, this is an example, and the determination may be performed by another condition. For example, this may be to determine whether or not image capturing of the target object 400 is completed at all the preset positions or may be to ask the user whether or not a sufficient number of images are acquired and cause the user to input the reply.

In step S107, the CPU 151 determines whether or not a preset number of target objects 400 have been captured. If the predetermined number of target objects 400 have been captured (step S107, YES), the process proceeds to step S109. If the predetermined number of target objects 400 have not yet been captured (step S107, NO), the process proceeds to step S108.

In step S108, the control apparatus 100 performs a process for changing the target object 400 by causing the user to place another target object 400 on the placement stage 204. This process may be, for example, a process in which the display information generation unit 105 generates display information including a message to urge the user to replace the target object 400 with another object and causes the display device 156 to display the message. The process then returns to step S102, and the same image acquisition is performed on the changed target object 400.

Note that, although the determination criterion in step S107 is the number of target objects 400, this is an example, and the determination may be performed in accordance with another condition. For example, this may be to determine whether or not preset image capturing of all the target objects 400 has been completed or may be to ask the user whether or not to finish an image capturing process and cause the user to input the reply thereto.

In step S109, the feature amount acquisition unit 104 performs a process of acquiring feature amounts from a plurality of images acquired by the image acquisition unit 103. This acquisition of feature amounts may be a process of extracting a plurality of feature portions (feature points) included in images and acquiring the coordinate group of the extracted feature points as feature amounts, for example. Note that the image acquisition unit 103 and the feature amount acquisition unit 104 are both to acquire target object information and thus may be referred to as an information acquisition unit in a more general sense.

As described above, a plurality of images and a plurality of feature amounts are acquired and stored in the storage unit 106. FIG. 6 is a table illustrating an example of information acquired by the information acquisition system 10 and stored in the storage unit 106. In this example, the target object 400 is a product sold in a shop or the like.

As illustrated in FIG. 6, items of "Product identifier (ID)", "Product name", "Image", "Feature amount", "Camera ID", "Emission condition", and "Product position" are stored in the storage unit 106 in association with each other. The item "Product ID" represents IDs such as identification numbers of products, and the item "Product name" represents names of products.

The item "Image" represents file names of a plurality of images acquired by the image acquisition unit 103. The item "Image" is stored in association with the items "Product ID" and "Product name" of the captured target object 400. The item "Feature amount" represents file names of a plurality of feature amounts acquired by the feature amount acquisition unit 104. The item "Feature amount" is stored in association with images whose feature amounts have been acquired and the items "Product ID" and "Product name" of the target object 400. Since a plurality of images and a plurality of feature amounts are acquired from a single target object 400 in the process illustrated in FIG. 5, a plurality of images and a plurality of feature amounts are associated with a single product as illustrated in FIG. 6.

The item "Camera ID" represents IDs that identify the cameras 202 that have captured respective images. The camera ID is one of the image capturing conditions. Since the position of the camera 202 is determined by the camera IDs such as "camera 1", "camera 2", and the like, the angle at which the target object 400 is captured is determined. Although only the IDs of the camera 202 are listed as an image capturing condition in FIG. 6, other image capturing conditions than the camera ID, such as a shutter speed, an aperture value, a focal distance, ISO sensitivity, or the like may be further stored.

The item "Emission condition" represents conditions such as turning on or off of light emission of the plurality of light sources 201, a light amount during light emission, a light emission timing, a light color, or the like, which is one of the image capturing conditions. FIG. 6 lists recipe numbers such as "recipe 1", "recipe 2", and the like that are condition groups each listing a combination of conditions of the light sources 201.

The item "product position" represents the position of the target object 400 on the placement stage 204. This position may be input by the user, or the position may be determined by analysis of a plurality of images. FIG. 6 illustrates a reference denoting a placement position assuming that the target object 400 is placed on a predetermined position such as "position A". However, the position may be determined by another method, for example, the position may be determined by position coordinates of the target object 400 on the placement stage 204.

Acquisition of target object information performed by the information acquisition system 10 has been described above. The target object information acquired by the information acquisition system 10 is used as training data for a discriminator included in the identification apparatus 300, reference data at identification in a discriminator, or evaluation data in a discriminator. The overview of the process in the identification apparatus 300 will be described with reference to FIG. 7 to FIG. 9.

Figure 7:
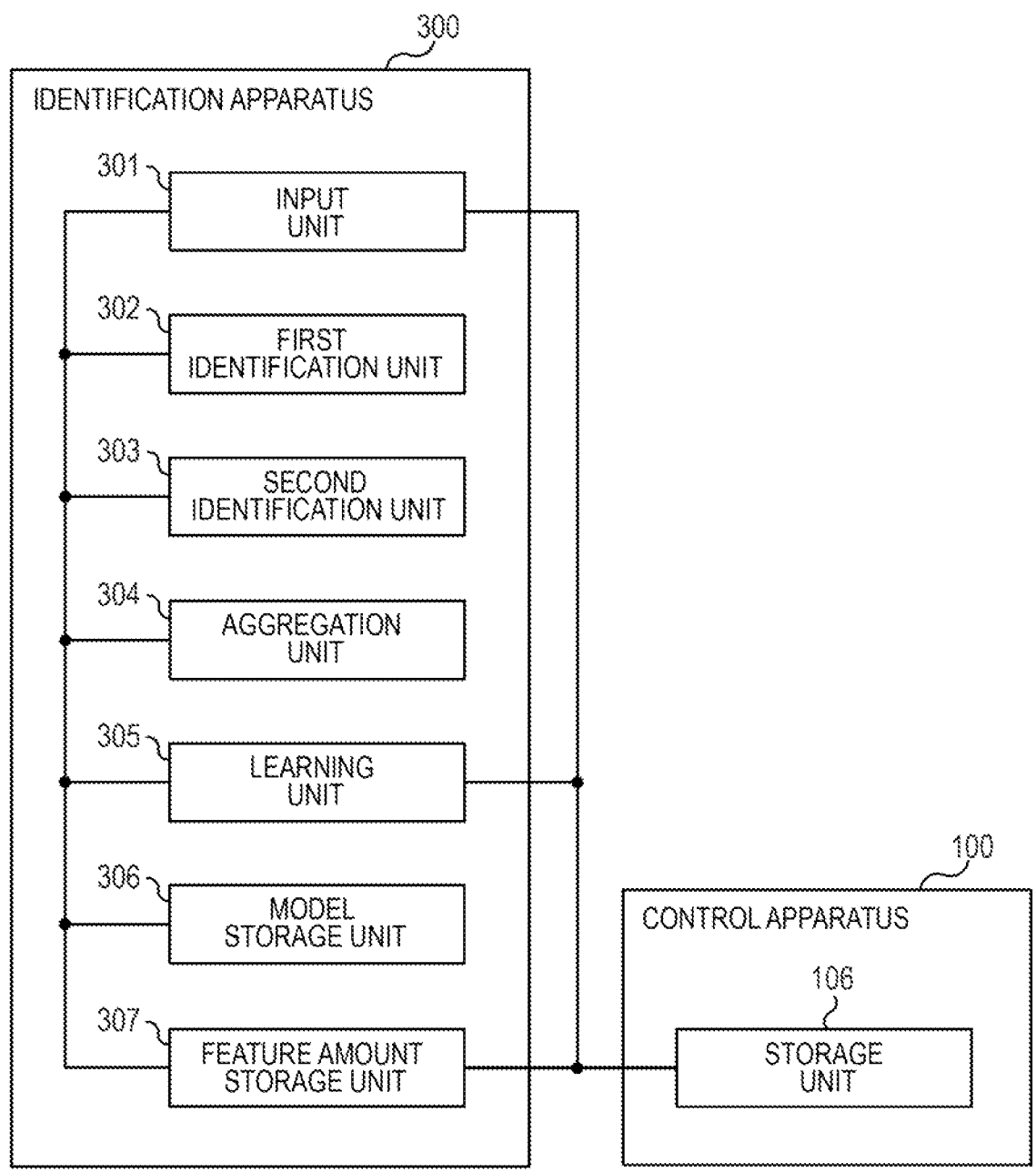
FIG. 7 is a function block diagram of an identification apparatus according to the first example embodiment.

FIG. 7 is a function block diagram of the identification apparatus 300 according to the present example embodiment. The identification apparatus 300 has an input unit 301, a first identification unit 302, a second identification unit 303, an aggregation unit 304, a learning unit 305, a model storage unit 306, and a feature amount storage unit 307. Since the hardware configuration of the identification apparatus 300 is the same as that of the control apparatus 100, the description thereof will be omitted. Further, the function of each unit is implemented when the CPU of the identification apparatus 300 performs a process based on a program.

The input unit 301 is a section to which an image including an identifying target in the identification apparatus 300 is input. The first identification unit 302 is a section that identifies an object in an image by using a machine learning model constructed by a neural network such as deep learning. The second identification unit 303 is a section that identifies an object by performing image matching using feature amounts. The aggregation unit 304 is a section that aggregates an identification result from the first identification unit 302 and an identification result from the second identification unit 303 to generate a final identification result.

The learning unit 305 is a section that performs control of a learning process such as acquiring, from the storage unit 106, training data for learning a machine learning model of the first identification unit 302. The model storage unit 306 is a section that stores a machine learning model. The feature amount storage unit 307 is a section that acquires, from the storage unit 106, and stores a feature amount that is reference data used in matching in the second identification unit 303.

Figure 8:
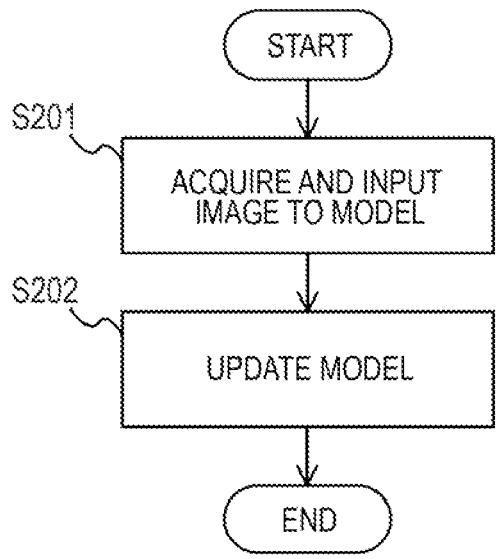
FIG. 8 is a flowchart illustrating a process of learning performed by the identification apparatus according to the first example embodiment.

FIG. 8 is a flowchart illustrating a process of learning a machine learning model performed by the identification apparatus 300 according to the present example embodiment. First, the process of learning a machine learning model will be described with reference to FIG. 8.

The process of FIG. 8 is performed when the user performs a training operation on the identification apparatus 300. In step S201, the learning unit 305 acquires an image including an identifying target from the storage unit 106. The acquired image is input to the first identification unit 302 and used as training data of the machine learning model. Note that, in the present learning process, the learning may be performed by using an image obtained by processing an input image, such as an image obtained by rotating an input image by a predetermined angle, an image obtained by composing a plurality of images, or the like.

In step S202, the first identification unit 302 performs learning by using training data and updates a model so that a result of the learning is reflected thereto. This update of the model may be a process of changing weights among neurons forming a neural network, for example. The updated model is stored in the model storage unit 306.

Figure 9:
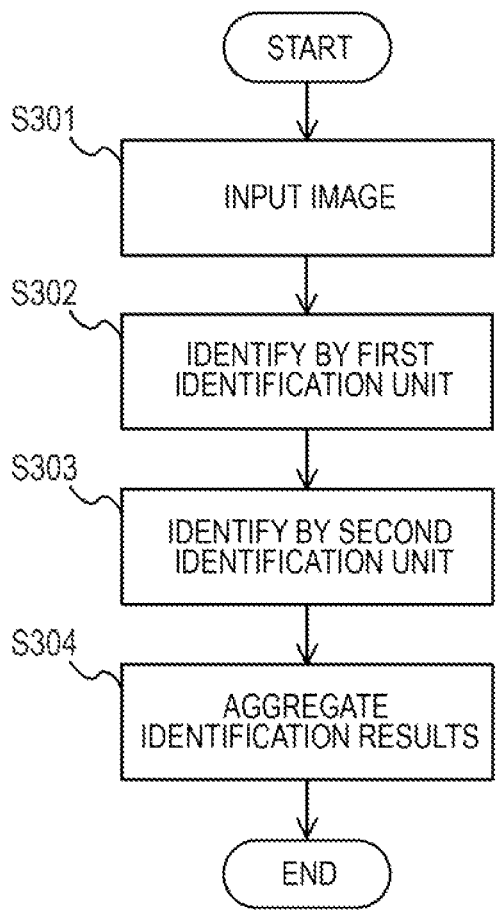
FIG. 9 is a flowchart illustrating a process of identification or evaluation performed by the identification apparatus according to the first example embodiment.

FIG. 9 is a flowchart illustrating a process of identification or evaluation performed by the identification apparatus 300 according to the present example embodiment. A process at the time of identification performed by the identification apparatus 300 or at the time of evaluation performed by the identification apparatus 300 will be described with reference to FIG. 9. Herein, the time of identification refers to a point of time of actually determining an object of interest by using an image of the object to be identified, and the time of evaluation refers to a point of time of evaluating whether or not the object can be correctly determined by using a test image including one or a plurality of objects. Note that the evaluation as used herein may include adjusting a parameter of the identification apparatus 300 so that a more suitable result is obtained based on an evaluation result using a test image. Although the process at the time of identification and the process at the time of evaluation are different from each other in their purposes, respective flows thereof are substantially the same, and thus these processes will be collectively described below.

The process of FIG. 9 is performed when the user performs an operation of identification or evaluation on the identification apparatus 300. In step S301, the input unit 301 accepts input of an image to be identified or an image used for evaluation in the identification apparatus 300.

In step S302, the first identification unit 302 uses the machine learning model learned and stored in the model storage unit 306 to identify an object included in the input image. For example, this identification process is such a process that, when an apple is included in an input image, identifies the object as an apple. Alternatively, the identification process may be such a process that, when several varieties of apples may be included in an image, identifies the object as an apple and further determines the variety of the apple.

In step S303, the second identification unit 303 extracts a feature amount from the input image, performs matching with feature amounts stored in the feature amount storage unit 307, and thereby identifies an object included in the input image. This identifying process may also be to perform the same identification as in the process in the first identification unit 302.

In step S304, the aggregation unit 304 aggregates an identification result from the first identification unit 302 and an identification result from the second identification unit 303 to generate the final identification result. This process may be to aggregate two identification results at an application ratio in accordance with the type of the object taking into consideration of the identification results of the object from the first identification unit 302 and the second identification unit 303.

The machine learning such as deep learning exhibits high accuracy in identification of natural objects whose individual external appearances significantly differ from each other, and feature amount matching exhibits high accuracy in identification of artificial objects such as industrial products for which many types of objects having very similar external appearances exist. In such a way, a suitable algorithm may differ in accordance with the type of the object. As described above, the identification apparatus 300 has the first identification unit 302 based on machine learning such as deep learning and the second identification unit 303 based on feature amount matching. The identification apparatus 300 can accurately identify various objects by aggregating output results from the two algorithms.

The information acquisition system 10 of the present example embodiment controls the image capture apparatus 200 to capture the target object 400 with a plurality of different environment conditions. Accordingly, it is possible to efficiently acquire a plurality of images used for object identification captured in accordance with a plurality of environment conditions. The acquired images used for object identification is input to the identification apparatus 300 and used as reference data at the time of identification in a discriminator or evaluation data in a discriminator. Regardless of which of the purposes described above the images used for object identification are used for, the larger the number of images used for object identification is, the higher the realized accuracy of the identification apparatus 300 is. Therefore, an increase in accuracy of the identification apparatus 300 is realized by efficient acquisition of a large number of images used for object identification by using the information acquisition system 10 of the present example embodiment.

Second Example Embodiment

The information acquisition system 10 of the present example embodiment is different from that of the first example embodiment in that a display unit 208 is provided in the image capture apparatus 200. In the following, features different from those of the first example embodiment will be mainly described, and description of common features will be omitted or simplified.

Figure 10:
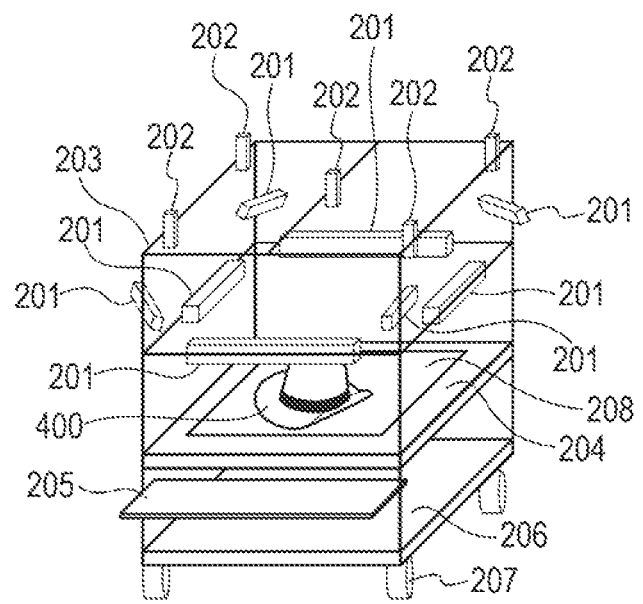
FIG. 10 is a diagram schematically illustrating the external appearance of an image capture apparatus according to a second example embodiment.

FIG. 10 is a diagram schematically illustrating the external appearance of the image capture apparatus 200 according to the present example embodiment. In the present example embodiment, the placement stage 204 has the display unit 208 in a part of the surface on which the target object 400 is placed.

The display unit 208 is formed of a liquid crystal display, an OLED display, or the like and is controlled by the control apparatus 100. The display unit 208 can display a background image in accordance with the control from the control apparatus 100. The classification of this background image is one of the environment conditions, and the control apparatus 100 can perform control so as to acquire a plurality of images in accordance with a plurality of different environment conditions by changing the background image displayed on the display unit 208.

An example of the background image will be described. Any background image may be used for the background image as long as it can provide a change in the view of the target object 400 due to a change of the background of the target object 400. A specific example of the background image may be a solid image such as a red image, a blue image, a white image, a black image, or the like. In such a case, a plurality of images with a changed background color can be obtained. This enables learning taking into consideration of influence by the change of the contrast in an image due to the relationship between the color of the target object 400 and the background color. Further, by setting the luminance value of the background image to a preset known value, this enables self-correction of the color, the luminance, or the like of the target object 400 in the image after captured.

Further, another example of the background image may be an image to display a known pattern such as a text, a figure, or the like. In such a case, since a part of the known pattern is hidden by the target object 400, the contour of the target object 400 becomes clear. Thereby, it is possible to utilize a known pattern in an image processing, such as to cut out a region of the target object 400 from an obtained image to use the region.

Further, yet another example of the background image may be an image to display a figure having a known size, such as a grid pattern, a dimension line, or the like. Thereby, it is possible to measure the size of the target object 400 from an obtained image.

As described above, according to the present example embodiment, because the display unit 208 that can change the background image is provided, the information acquisition system 10 that can acquire a plurality of images in which a plurality of different background images are displayed is provided.

Note that, in the present example embodiment, the display unit 208 may be used in operation navigation for the user. For example, in the process of step S106, the display unit 208 may display the position or the orientation to which the target object 400 is to be moved. Specifically, the position or the placing orientation of the target object 400 is displayed by a text such as a message or a figure such as an arrow, a broken line, or the like, and thereby operation navigation for the user is realized. Further, in the process of step S101 or step S108, the display unit 208 may display the position or the placing orientation of the target object 400 in the same manner as that described above and may display the type or the name of the target object 400 to be placed.

Modified Example of the Second Example Embodiment

As a modified example of the structure of the placement stage 204 in the second example embodiment described above, a part of the placement stage 204 may be replaced with an optically transparent material (transparent portion). That is, the portion of the display unit 208 in FIG. 10 may be replaced with a transparent portion. An example of a material forming the transparent portion may be a plastic, a glass, or the like. In this example, it is possible to have a colorless (transparent) background of an image when capturing an image of the target object 400 from the upper side. Further, with further modification to additionally install the camera 202 under the placement stage 204, it is possible to capture an image of the target object 400 through the transparent portion. Accordingly, it is possible to capture an image of the underside of the target object 400 without turning the target object 400 over.

Note that, when the display unit 208 is a display having light transmissivity, such as a transparent OLED display, the display unit 208 can have both the function of changing the background in the second example embodiment and the function of the transparent portion in this modified example.

Third Example Embodiment

The information acquisition system 10 of the present example embodiment is different from that of the first example embodiment in that a position change unit 209 is provided in the image capture apparatus 200. In the following, features different from those of the first example embodiment will be mainly described, and description of common features will be omitted or simplified.

Figure 11:
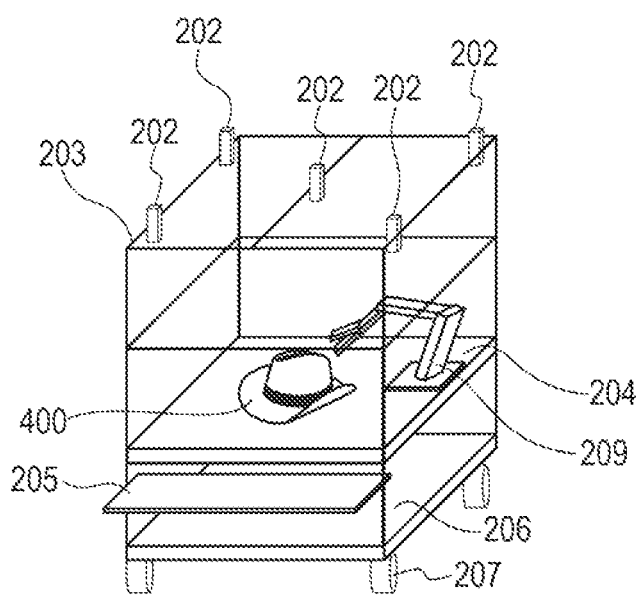
FIG. 11 is a diagram schematically illustrating the external appearance of an image capture apparatus according to a third example embodiment.

FIG. 11 is a diagram schematically illustrating the external appearance of the image capture apparatus 200 according to the present example embodiment. In the present example embodiment, the image capture apparatus 200 has the position change unit 209 that changes the position of the target object 400. Note that, in FIG. 11, illustration of the light source 201 is omitted.

The position change unit 209 is a robot arm as illustrated in FIG. 11, for example, and is controlled by the control apparatus 100. The position change unit 209 can move the target object 400 to change the position thereof in accordance with the control from the control apparatus 100. It is therefore possible to change the position of the target object 400 automatically without requiring the user to move the target object 400 manually. This process is performed when the position of the target object 400 is changed in the process of step S106 of FIG. 5.

According to the present example embodiment, it is possible to change the position of the target object 400 automatically in accordance with the control from the control apparatus 100, and the information acquisition system 10 leading to a more simplified user operation is provided.

Note that the configuration of the position change unit 209 is not limited to a robot arm and may be other configurations as long as it changes the positional relationship between the target object 400 and the camera 202. For example, a part of the placement stage 204 may be formed of a belt conveyer, and the image capture apparatus 200 may be configured to be able to automatically move the target object 400. Alternatively, a camera drive mechanism that can move the position of the camera 202 may be added, and thereby the image capture apparatus 200 may be configured such that the positional relationship between the target object 400 and the camera 202 automatically changes. Alternatively, if the expected target object 400 is a light object such as clothing, the position change unit 209 may be a fan that blows off and moves the target object 400.

Further, the process of moving the target object 400 by using the position change unit 209 may be performed when the target object is changed in the process of step S108 of FIG. 5. In such a case, the user operation is further simplified. A specific configuration of the image capture apparatus 200 that implements this process may be a configuration in which the position change unit 209 is a belt conveyer and, upon completion of image capturing of one target object, the belt conveyer is driven to automatically cause the next target object to move into the image capturing range.

Note that it is desirable that the position change unit 209 can turn the target object 400 over. In a state where the target object 400 is placed on the placement stage 204, typically, an image of the underside of the target object 400 is unable to be obtained even when images are captured by the plurality of cameras 202. In contrast, by using the position change unit 209 to turn the target object 400 over, it becomes possible to capture an image of the underside of the target object 400.

Fourth Example Embodiment

The information acquisition system 10 of the present example embodiment is different from that of the first example embodiment in that a process of optimizing image storage is added to the process of step S104 of FIG. 5. In the following, features different from those of the first example embodiment will be mainly described, and description of common features will be omitted or simplified.

Figure 12:
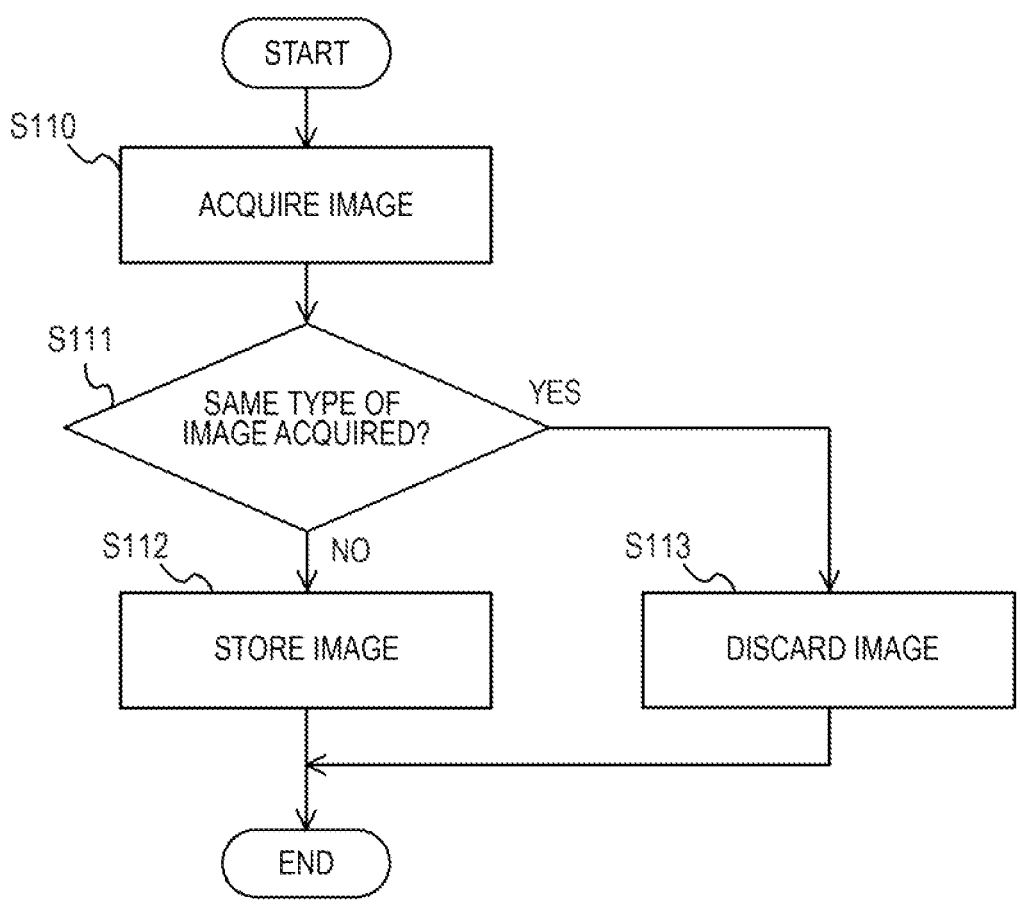
FIG. 12 is a flowchart illustrating a process of acquiring an image performed by a control apparatus according to a fourth example embodiment.

FIG. 12 is a flowchart illustrating a process of acquiring an image performed by the control apparatus 100 according to the present example embodiment. This process illustrates the process of step S104 of FIG. 5 in more detail, and since the processes other than step S104 are the same as those of FIG. 5, the description thereof will be omitted.

In step S110, the image acquisition unit 103 acquires a plurality of images captured by the plurality of cameras 202. In step S111, the CPU 151 determines whether or not an image including the same type of object as the target object 400 included in the image acquired in step S110 is already been stored in the storage unit 106. If an image including the same type of object has been acquired (step S111, YES), the process proceeds to step S113. If an image including the same type of object has not been acquired (step S111, NO), the process proceeds to step S112.

In step S112, the image acquired in the process of step S110 is stored in the storage unit 106. On the other hand, in step S113, the image acquired in the process of step S110 is discarded and not stored in the storage unit 106.

As described above, in the present example embodiment, it is determined whether or not an image of the same type of object has already been stored in the storage unit 106 at the time of image acquisition, and different processes are performed in accordance with a determination result. Accordingly, it is possible to prevent images including the same type of objects from being duplicated and registered as different one and avoid an unnecessary increase in data amount.

Note that the same type of objects may be, for example, objects handled as the same type of products in retail business, such as products having the same name, the same breed of perishable foods (for example, vegetables, fruits, fresh fish, dressed meet), or the like.

Although the image is discarded in the process of step S113, this image may be stored in the storage unit 106 if a process distinguished from the case of step S112 is performed. For example, the process may be to provide a duplication flag indicating that the same type of object has already been stored and then store the image in the storage unit 106. In such a case, it is possible to reduce the number of steps by performing a learning process, an evaluation process, or the like by skipping an image to which a duplication flag is provided at learning, at evaluation, or the like, and therefore a higher efficiency of these processes is realized.

Fifth Example Embodiment

A product registration system 50 of the present example embodiment includes a discriminator configured using target object information such as an image, a feature amount, or the like acquired by the information acquisition system 10 of the first to fourth example embodiment described above. The product registration system 50 identifies an image of a product to acquire identification information on the product by using the discriminator and performs product registration.

Figure 13:
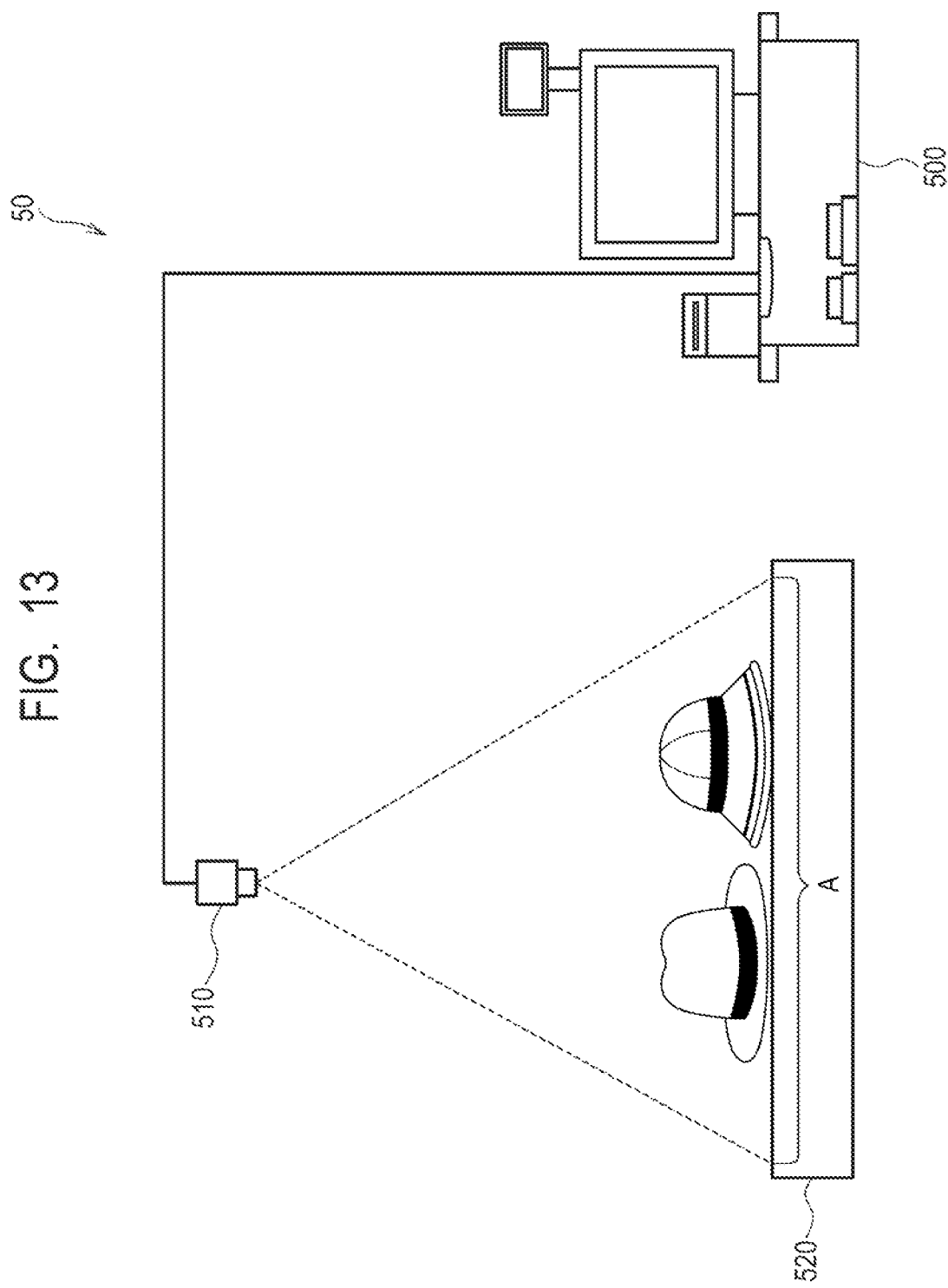
FIG. 13 is a schematic diagram illustrating an overall configuration of a product registration system according to a fifth example embodiment.

The product registration system 50 according to the present example embodiment will be described with reference to FIG. 13 to FIG. 15. FIG. 13 is a schematic diagram illustrating the overall configuration of the product registration system 50 according to the present example embodiment. The product registration system 50 has a product registration apparatus 500, a product image capturing apparatus 510, and a product registration stage 520. Note that the product registration system 50 of the present example embodiment may be operated by a salesclerk or may be a so-called self-service register operated by a customer alone.

The product registration apparatus 500 is an apparatus that registers a product carried by a customer and performs calculation of a sales amount for price adjustment or the like in a retail shop. The product registration apparatus 500 may be in cooperation with a Point Of Sales (POS) system and may be referred to as a POS apparatus.

The product image capturing apparatus 510 is an apparatus having an image acquisition function, such as a camera, and is arranged above the product registration stage 520 so as to be able to capture an image capturing region A that is a part or whole of the upper surface of the product registration stage 520. The product registration stage 520 is a stage on which a product to be purchased by a customer is placed. The operation of placing a product may be performed by a customer or may be performed by a salesclerk. Further, a plurality of products may be placed or a single product may be placed.

Figure 14:
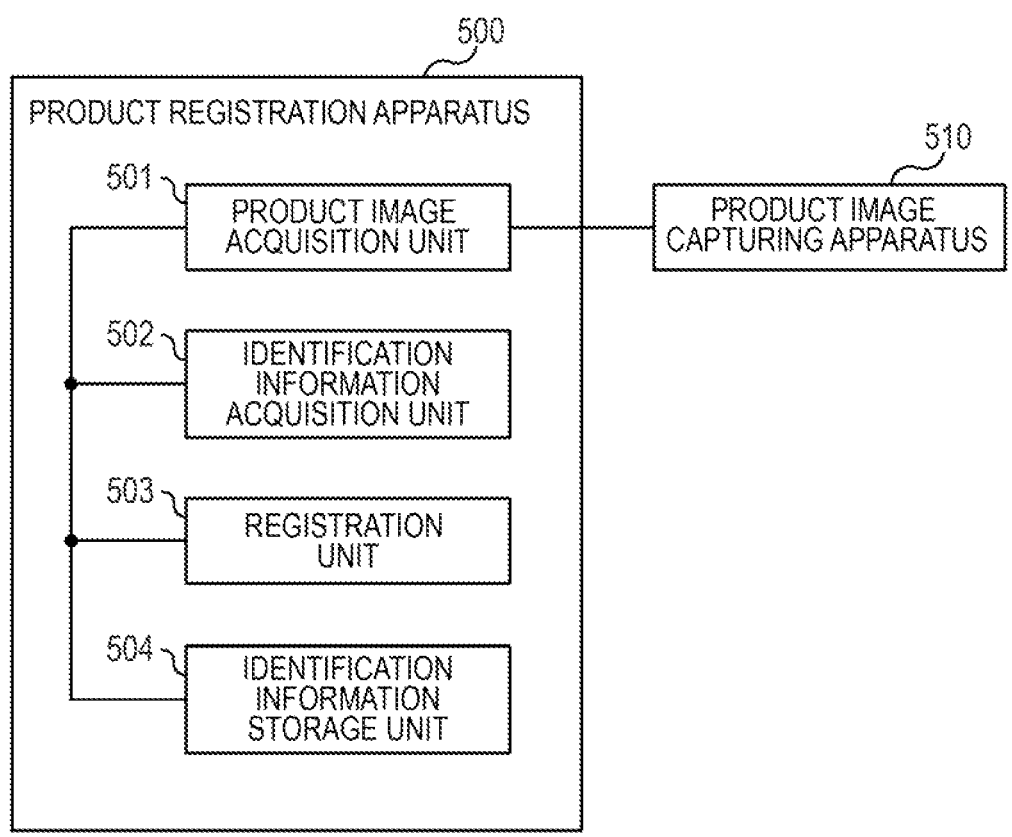
FIG. 14 is a function block diagram of a product registration apparatus according to the fifth example embodiment.

FIG. 14 is a function block diagram of the product registration apparatus 500 according to the present example embodiment. The product registration apparatus 500 has a product image acquisition unit 501, an identification information acquisition unit 502, a registration unit 503, and an identification information storage unit 504. Note that, since the hardware configuration of the product registration apparatus 500 is a configuration in which a money adjustment apparatus such as a cash drawer, a receipt printer, a card reader, or the like provided to a general POS apparatus is added to the computer hardware illustrated in FIG. 2, the description thereof will be omitted. Further, the function of each unit is implemented when the CPU of the product registration apparatus 500 performs a process based on a program.

The identification information acquisition unit 502 is a section having the function of the identification apparatus 300 illustrated in FIG. 7, for example. The identification information acquisition unit 502 includes a discriminator configured using the target object information such as an image, a feature amount, or the like acquired by the information acquisition system 10 of each of the first to fourth example embodiments described above.

The identification information storage unit 504 stores a product that can be identified by the discriminator and identification information on the product in association with each other. Herein, the identification information is a product ID used for identifying the classification of a product, for example. A POS system provided in a shop or the like of a retail shop can determine a price, a stock amount, or the like of a product based on a product ID. The functions of the product image acquisition unit 501 and the registration unit 503 will be described later.

Figure 15:
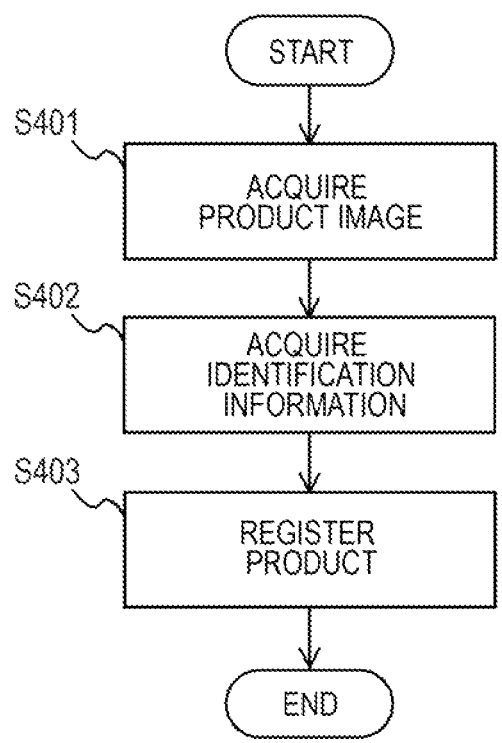
FIG. 15 is a flowchart illustrating a product registration process performed by the product registration apparatus according to the fifth example embodiment.

FIG. 15 is a flowchart illustrating a process of product registration performed by the product registration apparatus 500 according to the present example embodiment. The process of FIG. 15 is started when a customer or a salesclerk performs a predetermined operation on the product registration apparatus 500 after a product to be purchased by the customer is placed on the product registration stage 520.

In step S401, the product image acquisition unit 501 captures the image capturing region A to acquire a product image by controlling the product image capturing apparatus 510. One or a plurality of products may be included in this product image.

In step S402, the identification information acquisition unit 502 identifies the product included in the product image and acquires identification information on the corresponding product from the identification information storage unit 504. When a plurality of products are included in the product image, identification information is acquired for each of the plurality of products.

In step S403, the registration unit 503 determines and registers the product to be purchased by the customer based on the identification information acquired in step S402. When a plurality of products are included in the product image, all the plurality of products are registered. For example, the registered product is displayed together with the price on a display provided to the product registration system 50, and the customer is able to perform adjustment for purchase of the product. This adjustment process may be integrally provided in the product registration system 50 or may be performed in an adjustment apparatus separately provided in the retail shop.

According to the present example embodiment, the product registration system 50 including a discriminator configured using target object information such as an image, a feature amount, or the like acquired by the information acquisition system 10 of each of the first to fourth example embodiments described above is provided. Since the information acquisition system 10 can efficiently acquire a plurality of images used for object identification captured in accordance with a plurality of environment conditions, the product registration system 50 including the discriminator constructed by using these images used for object identification can accurately identify a product and register the product.

Further, the product registration system 50 of the present example embodiment can perform product registration collectively by only arranging a plurality of products on the product registration stage 520. Accordingly, it is possible to perform a product registration operation in a short time compared to a case where performing product registration by reading a barcode from each product or the like.

The system described in the example embodiments described above can also be configured as with the sixth example embodiment below.

Sixth Example Embodiment

Figure 16:
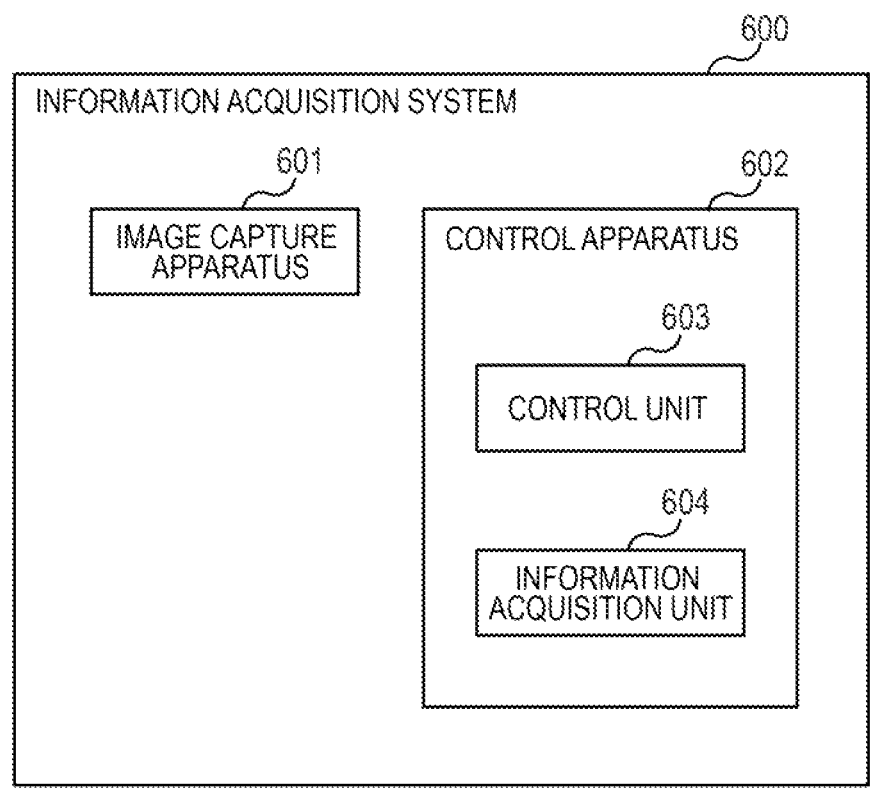
FIG. 16 is a function block diagram of an information acquisition system according to a sixth example embodiment.

FIG. 16 is a function block diagram of an information acquisition system 600 according to the sixth example embodiment. The information acquisition system 600 has an image capture apparatus 601 and a control apparatus 602. The control apparatus 602 has a control unit 603 and an information acquisition unit 604. The image capture apparatus 601 includes a camera that captures a target object to generate an image. The control unit 603 controls the image capture apparatus 601 so that a plurality of images captured in accordance with a plurality of different environment conditions are generated. The information acquisition unit 604 acquires target object information input to a discriminator that identifies an object. The target object information includes the plurality of images or a plurality of feature amounts obtained from the plurality of images.

According to the present example embodiment, the information acquisition system 600 that can efficiently acquire a plurality of images used for object identification captured in accordance with a plurality of environment conditions is provided.

Modified Example Embodiments

The present invention is not limited to the example embodiments described above and can be modified as appropriate within a range not departing from the spirit of the present invention.

In the example embodiments described above, the number of target objects 400 may be plural. In such a case, the user places the plurality of target objects 400 on the placement stage 204. The image capture apparatus 200 collectively captures the plurality of target objects 400. In such a case, the image acquisition unit 103 may divide an image on a target object 400 basis to acquire images by separately detecting the plurality of target objects 400 by using an image recognition technology such as edge detection or may acquire an image in a state where the plurality of target objects 400 are included in a single image. Regardless of in which of the states described above the image is acquired, the feature amount acquisition unit 104 acquires a feature amount on a target object 400 basis. In this example, collective image capturing of a plurality of target objects 400 shortens the operation time.

In the example embodiments described above, while having the wheels 207 and configured to be movable, the image capture apparatus 200 has the structure that is basically supposed to be stationarily installed. However, it may be more convenient to carry the image capture apparatus 200 to a place where the target object 400 is present, and there are needs where some users want to carry the image capture apparatus 200.

Accordingly, the image capture apparatus 200 may be configured to be able to accommodate the light sources 201, the cameras 202 and the frame 203 in a carry case and configured such that the inner surface or the outer surface of the carry case functions as the placement stage 204. In such a configuration, it is possible to assemble the image capture apparatus 200 by assembling the frame 203 in a lattice manner above the opened carry case and connecting the light sources 201 and the cameras 202 to the frame 203. Accordingly, the image capture apparatus 200 structured such that the input device installation stage 205, the control apparatus installation stage 206, and the wheels 207 are removed from FIG. 4 is realized. In this example, a portable image capture apparatus 200 is provided. Note that the control apparatus 100 used together with the image capture apparatus 200 may further be able to be accommodated in the carry case, and a portable PC such as a notebook PC may be used as the control apparatus 100.

Further, in the example embodiments described above, the image acquisition unit 103 of the control apparatus 100 or the information acquisition unit 604 may have a function of a one-dimensional code reader, a two-dimensional code reader, or Optical Character Recognition (OCR). Herein, the one-dimensional code and the two-dimensional code may be simply referred to as a code.

A character or a code may be provided to the target object 400 in an image. For example, such a character or a code includes product identification information that determines the classification of the target object 400, such as a product name, a product ID, or the like. The image acquisition unit 103 or the information acquisition unit 604 can further acquire information that determines the target object 400 corresponding to target object information (an image or a feature amount) on the target object 400 by acquiring the character or the code. Accordingly, it is possible to automatically associate a product name, a product ID, an image, a feature amount, or the like with each other, for example.

Further, in the example embodiments described above, the setting of an environment condition for image acquisition may be set in accordance with the environment of the installation place of the identification apparatus 300. For example, when the identification apparatus 300 is installed in a bright shop that direct sunlight may enter, it is desirable that the image used for learning in the identification apparatus 300 or the like be an image captured in a similar bright environment. Further, when the identification apparatus 300 is installed in a shop in which lighting of a color other than white, such as blue, green, yellow, red, or the like, is provided, it is desirable that the image used for learning in the identification apparatus 300 or the like be an image captured under lighting of a corresponding color. In such a way, by setting the environment condition for image acquisition taking the environment of the installation place of the identification apparatus 300 into consideration, it is possible to improve the identification accuracy of identification apparatus 300.

Further, in the example embodiments described above, although each image captured by the image capture apparatus 200 is supposed to be a static image, this may be a moving image. In such a case, by extracting some of the frame images forming a moving image, it is possible to perform the same process as that in the case of a static image. This example is effective when the target object 400 is moving such as when the target object 400 is an animal, when image capturing is performed while the user is moving the target object, or the like.

The scope of each of the example embodiments also includes a processing method that stores, in a storage medium, a program that causes the configuration of each of the example embodiments to operate so as to implement the function of each of the example embodiments described above, reads the program stored in the storage medium as a code, and executes the program in a computer. That is, the scope of each of the example embodiments also includes a computer readable storage medium. Further, each of the example embodiments includes not only the storage medium in which the program described above is stored but also the program itself. Further, one or two or more components included in the example embodiments described above may be a circuit such as an application specific integrated circuit (ASIC), a field programmable gate array (FPGA), or the like configured to implement the function of each component.

As the storage medium, for example, a floppy (registered trademark) disk, a hard disk, an optical disk, a magneto-optical disk, a compact disk (CD)-ROM, a magnetic tape, a nonvolatile memory card, or a ROM can be used. Further, the scope of each of the example embodiments includes an example that operates on operating system (OS) to perform a process in cooperation with another software or a function of an add-in board without being limited to an example that performs a process by an individual program stored in the storage medium.

Further, a service implemented by the function of each of the example embodiments described above may be provided to a user in a form of Software as a Service (SaaS).

Note that all the example embodiments described above are mere embodied examples in implementing the present invention, and the technical scope of the present invention should not be construed in a limiting sense by these example embodiments. That is, the present invention can be implemented in various forms without departing from the technical concept thereof or the primary feature thereof.

The whole or part of the example embodiments disclosed above can be described as, but not limited to, the following supplementary notes.

Supplementary Note 1

An information acquisition system comprising:
an image capture apparatus including a camera that captures a target object to generate an image; and
a control apparatus including
a control unit that controls the image capture apparatus so that a plurality of images in accordance with a plurality of different environment conditions are generated, and
an information acquisition unit that acquires target object information input to a discriminator that identifies an object, wherein the target object information includes the plurality of images or a plurality of feature amounts obtained from the plurality of images.

Supplementary Note 2

The information acquisition system according to supplementary note 1,
wherein the image capture apparatus further comprises a light source that emits light to the target object, and
wherein the control unit controls the image capture apparatus to generate a plurality of images with different emission conditions of the light.

Supplementary Note 3

The information acquisition system according to supplementary note 1 or 2,
wherein the image capture apparatus comprises a plurality of cameras arranged at positions different from each other, and
wherein the control unit controls the image capture apparatus to generate a plurality of images with different capturing positions by causing each of the plurality of cameras to capture the target object.

Supplementary Note 4

The information acquisition system according to any one of supplementary notes 1 to 3, wherein the control apparatus further comprises a storage unit that stores the target object information acquired by the information acquisition unit in association with the target object.

Supplementary Note 5

The information acquisition system according to supplementary note 4, wherein the storage unit further stores the environment conditions in association with the target object information.

Supplementary Note 6

The information acquisition system according to supplementary note 4 or 5, wherein the information acquisition unit determines whether or not the target object information on the same type of object as the target object is already stored in the storage unit at time of acquisition of the target object information and performs different processes in accordance with a determination result.

Supplementary Note 7

The information acquisition system according to any one of supplementary notes 4 to 6, wherein the information acquisition unit determines the target object corresponding to the target object information based on a character or a code included in at least one of the plurality of images.

Supplementary Note 8

The information acquisition system according to any one of supplementary notes 1 to 7, wherein the control unit sets the environment conditions in accordance with an environment of an installation place of an identification apparatus that performs identification by using the discriminator.

Supplementary Note 9

The information acquisition system according to any one of supplementary notes 1 to 8, wherein the target object information is used as training data for the discriminator, reference data at time of identification in the discriminator, or evaluation data of the discriminator.

Supplementary Note 10

The information acquisition system according to any one of supplementary notes 1 to 9,
wherein the image capture apparatus further comprises a placement stage on which the target object is placed, and
wherein the placement stage comprises a display unit that displays a background image.

Supplementary Note 11

The information acquisition system according to any one of supplementary notes 1 to 10,
wherein the image capture apparatus further comprises a placement stage on which the target object is placed,
wherein the placement stage is at least partially transparent, and
wherein the camera captures the target object through a transparent portion of the placement stage.

Supplementary Note 12

The information acquisition system according to any one of supplementary notes 1 to 11, wherein the image capture apparatus further comprises a position change unit that changes a positional relationship between the target object and the camera.

Supplementary Note 13

The information acquisition system according to any one of supplementary notes 1 to 12,
wherein the image capture apparatus is able to collectively capture a plurality of target objects, and
wherein the information acquisition unit acquires the target object information for each of the plurality of target objects.

Supplementary Note 14

A product registration apparatus comprising:
an identification information acquisition unit that acquires identification information on a product from a product image by using the discriminator to which the target object information acquired by the information acquisition system according to any one of supplementary notes 1 to 13 is input; and a registration unit that registers the product based on the identification information.

Supplementary Note 15

A control apparatus comprising:
a control unit that controls an image capture apparatus so that a plurality of images in accordance with a plurality of different environment conditions are generated; and
an information acquisition unit that acquires target object information input to a discriminator that identifies an object, wherein the target object information includes the plurality of images or a plurality of feature amounts obtained from the plurality of images.

Supplementary Note 16

An information acquisition method comprising:
controlling an image capture apparatus so that a plurality of images in accordance with a plurality of different environment conditions are generated; and
acquiring target object information input to a discriminator that identifies an object, wherein the target object information includes the plurality of images or a plurality of feature amounts obtained from the plurality of images.

Supplementary Note 17

A storage medium storing a program that causes a computer to perform an information acquisition method comprising:
controlling an image capture apparatus so that a plurality of images in accordance with a plurality of different environment conditions are generated; and
acquiring target object information input to a discriminator that identifies an object, wherein the target object information includes the plurality of images or a plurality of feature amounts obtained from the plurality of images.

This application is based upon and claims the benefit of priority from Japanese Patent Application No. 2018-176035, filed on Sep. 20, 2018, the disclosure of which is incorporated herein in its entirety by reference.

REFERENCE SIGNS LIST 10, 600 information acquisition system
50 product registration system
100, 602 control apparatus
101 light source control unit
102 camera control unit
103 image acquisition unit
104 feature amount acquisition unit
105 display information generation unit
106 storage unit
151 CPU
152 RAM
153 ROM
154 HDD
155 communication I/F
156 display device
157 input device
158 bus
200, 601 image capture apparatus
201 light source
202 camera
203 frame
204 placement stage
205 input device installation stage
206 control apparatus installation stage
207 wheel
208 display unit
209 position change unit
300 identification apparatus
301 input unit
302 first identification unit
303 second identification unit
304 aggregation unit
305 learning unit
306 model storage unit
307 feature amount storage unit
400 target object
500 product registration apparatus
501 product image acquisition unit
502 identification information acquisition unit
503 registration unit
504 identification information storage unit
510 product image capturing apparatus
520 product registration stage
603 control unit
604 information acquisition unit

What is claimed is:

1. An information acquisition system comprising:
an image capture apparatus including a camera that captures a target object to generate an image; and
a control apparatus including
a control unit that controls the image capture apparatus so that a plurality of images in accordance with a plurality of different environment conditions are generated;
an information acquisition unit that acquires target object information input to a discriminator that identifies an object, wherein the target object information includes the plurality of images or a plurality of feature amounts obtained from the plurality of images; and
a storage unit that stores the target object information acquired by the information acquisition unit in association with the target object, wherein
the information acquisition unit determines the target object corresponding to the target object information based on a character or a code included in at least one of the plurality of images.

2. The information acquisition system according to claim 1,
wherein the image capture apparatus further comprises a light source that emits light to the target object, and
wherein the control unit controls the image capture apparatus to generate the plurality of images with different emission conditions of the light.

3. The information acquisition system according to claim 1,
wherein the image capture apparatus comprises a plurality of cameras arranged at positions different from each other, and
wherein the control unit controls the image capture apparatus to generate the plurality of images with different capturing positions by causing each of the plurality of cameras to capture the target object.

4. The information acquisition system according to claim 1, wherein the storage unit further stores the environment conditions in association with the target object information.

5. The information acquisition system according to claim 1, wherein the information acquisition unit determines whether or not the target object information on a same type of object as the target object is already stored in the storage unit at time of acquisition of the target object information and performs different processes in accordance with a determination result.

6. The information acquisition system according to claim 1, wherein the control unit sets the environment conditions in accordance with an environment of an installation place of an identification apparatus that performs identification by using the discriminator.

7. The information acquisition system according to claim 1, wherein the target object information is used as training data for the discriminator, reference data at time of identification in the discriminator, or evaluation data of the discriminator.

8. The information acquisition system according to claim 1,
wherein the image capture apparatus further comprises a placement stage on which the target object is placed, and
wherein the placement stage comprises a display unit that displays a background image.

9. The information acquisition system according to claim 1,
wherein the image capture apparatus further comprises a placement stage on which the target object is placed,
wherein the placement stage is at least partially transparent, and
wherein the camera captures the target object through a transparent portion of the placement stage.

10. The information acquisition system according to claim 1, wherein the image capture apparatus further comprises a position change unit that changes a positional relationship between the target object and the camera.

11. The information acquisition system according to claim 1,
wherein the image capture apparatus is able to collectively capture a plurality of target objects, and
wherein the information acquisition unit acquires the target object information for each of the plurality of target objects.

12. A product registration apparatus comprising:
an identification information acquisition unit that acquires identification information on a product from a product image by using the discriminator to which the target object information acquired by the information acquisition system according to claim 1 is input; and
a registration unit that registers the product based on the identification information.

13. A control apparatus comprising:
a control unit that controls an image capture apparatus so that a plurality of images in accordance with a plurality of different environment conditions are generated;
an information acquisition unit that acquires target object information input to a discriminator that identifies an object, wherein the target object information includes the plurality of images or a plurality of feature amounts obtained from the plurality of images; and
a storage unit that stores the target object information acquired by the information acquisition unit in association with the target object, wherein
the information acquisition unit determines the target object corresponding to the target object information based on a character or a code included in at least one of the plurality of images.

* * * * *